United States Patent [19]
Yamashita

[11] Patent Number: 5,752,203
[45] Date of Patent: May 12, 1998

[54] PORTABLE RADIO APPARATUS HAVING CABLE-INCORPORATED HAND STRAP

[75] Inventor: Koji Yamashita, Tokyo, Japan

[73] Assignee: NEC Corporation, Tokyo, Japan

[21] Appl. No.: 532,883

[22] Filed: Sep. 22, 1995

[30] Foreign Application Priority Data

Sep. 22, 1994 [JP] Japan ................... 6-254791

[51] Int. Cl.$^6$ ................................................. H04B 1/38
[52] U.S. Cl. ..................... 455/575; 455/567; 455/90; 455/350; 455/351; 379/428; 379/455; 116/2
[58] Field of Search ................... 455/89, 90, 95, 455/128, 156.1, 157.2, 159.1, 344, 347, 348, 349, 351, 38.1–38.5, 550, 567, 575; 379/58, 454, 455, 428; 116/2, 3; 340/555, 427, 311.1, 571, 572, 687, 815.42

[56] References Cited

U.S. PATENT DOCUMENTS

| | | | |
|---|---|---|---|
| 4,546,345 | 10/1985 | Naito | 340/555 |
| 4,893,351 | 1/1990 | McKee et al. | 455/347 |
| 4,951,311 | 8/1990 | Sterr | 379/376 |
| 5,087,906 | 2/1992 | Eaton et al. | 340/311.1 |

FOREIGN PATENT DOCUMENTS

| | | |
|---|---|---|
| 0 363 998 A2 | 4/1990 | European Pat. Off. . |
| 0 445 808 A1 | 9/1991 | European Pat. Off. . |
| 0467071 | 1/1992 | European Pat. Off. . |
| 1191294 | 5/1970 | United Kingdom . |

Primary Examiner—Reinhard Eisenzopf
Assistant Examiner—Doris To
Attorney, Agent, or Firm—Sughrue, Mion, Zinn, Macpeak & Seas, PLLC

[57] ABSTRACT

A portable radio apparatus including a main body, a cable-incorporated hand strap, and an informer. The informer is electrically and/or optically connected to the main body through the cable incorporated in the hand strap. The informer may comprise a sounder and an indicator which inform the user of an incoming call by sound and light, respectively, or either the sounder or the indicator. The hand strap itself may include optical fibers which are optically connected to the main body. Since the informer is provided in the hand strap, it can be placed at a position away from the main body.

7 Claims, 5 Drawing Sheets

5,752,203

PORTABLE RADIO APPARATUS HAVING CABLE-INCORPORATED HAND STRAP

FIELD OF THE INVENTION

The present invention relates generally to portable radio apparatuses such as a radio telephone set, and more particularly to an improvement in a portable radio apparatus having a function of informing a user of an incoming call.

DESCRIPTION OF THE RELATED ART

A conventional portable radio telephone set is shown in FIG. 1 by way of example. A microphone 12, a speaker 13, a sounder (or a ringer) 14 for informing of an incoming call by sound, an indicator 15 for informing of an incoming call by means of a blinking light, and other necessary members such as a key pad and a liquid crystal display are assembled into the main body 11 of the portable radio telephone set. Furthermore, a hand strap 16 is provided in the main body 11 to prevent dropping when carrying and using.

Since such a portable telephone set is carried by an individual, the carrying methods are various between users. Some persons carry a telephone set with the hand strap 16 hung on the wrist and the main body 11 gripped, or other persons carry a telephone set with it put in a brief case, a hand bag, or a pocket of clothes. In either carrying state, it is necessary that the user can notice by way of the ringer 14 and/or the indicator 15 an incoming call immediately and respond to it.

When, however, the conventional portable telephone set is put in a brief case or the like and carried, the blinking call indicator 15 cannot be seen and also the calling sound of the ringer 14 becomes difficult to hear. Even in a case where a person carries the telephone set with it in their clothes pocket, the calling sound will become difficult to hear if the surrounding noise is loud. Also, in a case where the calling sound is made louder in correspondence with the volume of surrounding noise, when the user goes into quiet environments, there is the inconvenience that incoming calls may be abrupt, loud, and possibly disruptive. In addition, changing the volume of the calling sound each time the surrounding noise changes is a troublesome operation. Moreover, automatically regulating the volume with a sensor makes the telephone set structurally complex and expensive.

SUMMARY OF THE INVENTION

An object of the present invention is to provide a portable radio apparatus which is capable of reliably informing a user of an incoming call with a simple structure.

Another object of the present invention is to provide a portable radio apparatus which is capable of reliably informing a user of an incoming call without being disruptive to others.

In accordance with an aspect of the present invention, there is provided a portable radio apparatus having a function of informing a user of an incoming call, wherein a cable-incorporated hand strap is connected to the main body of the apparatus at an end thereof and is connected to an informer at the other end thereof. The informer is electrically and/or optically connected to the main body through the cable incorporated in the hand strap. The informer may comprise a sounder (a ringer) and an indicator which informs the user of an incoming call by sound and light, respectively. The informer may comprise either a sounder or an indicator. If the informer is provided at the hand strap, the main body does not have to be provided with the informing function.

In accordance with another aspect of the present invention, there is provided a portable radio apparatus, wherein a hand strap itself is comprised of optical fibers which is optically connected to the light emitting means of the main body.

Since the informer is provided in the hand strap, the informer can be placed at a position away from the main body of the radio apparatus. Therefore, even when the main body of the radio apparatus is kept in a brief case or the like, the informer can be placed outside, resulting in reliably drawing the user's attention to an incoming call.

BRIEF DESCRIPTION OF THE DRAWINGS

The present invention will be described in further detail with reference to the accompanying drawings, in which.

DETAILED DESCRIPTION OF THE PREFERRED EMBODIMENTS

Figure 1:
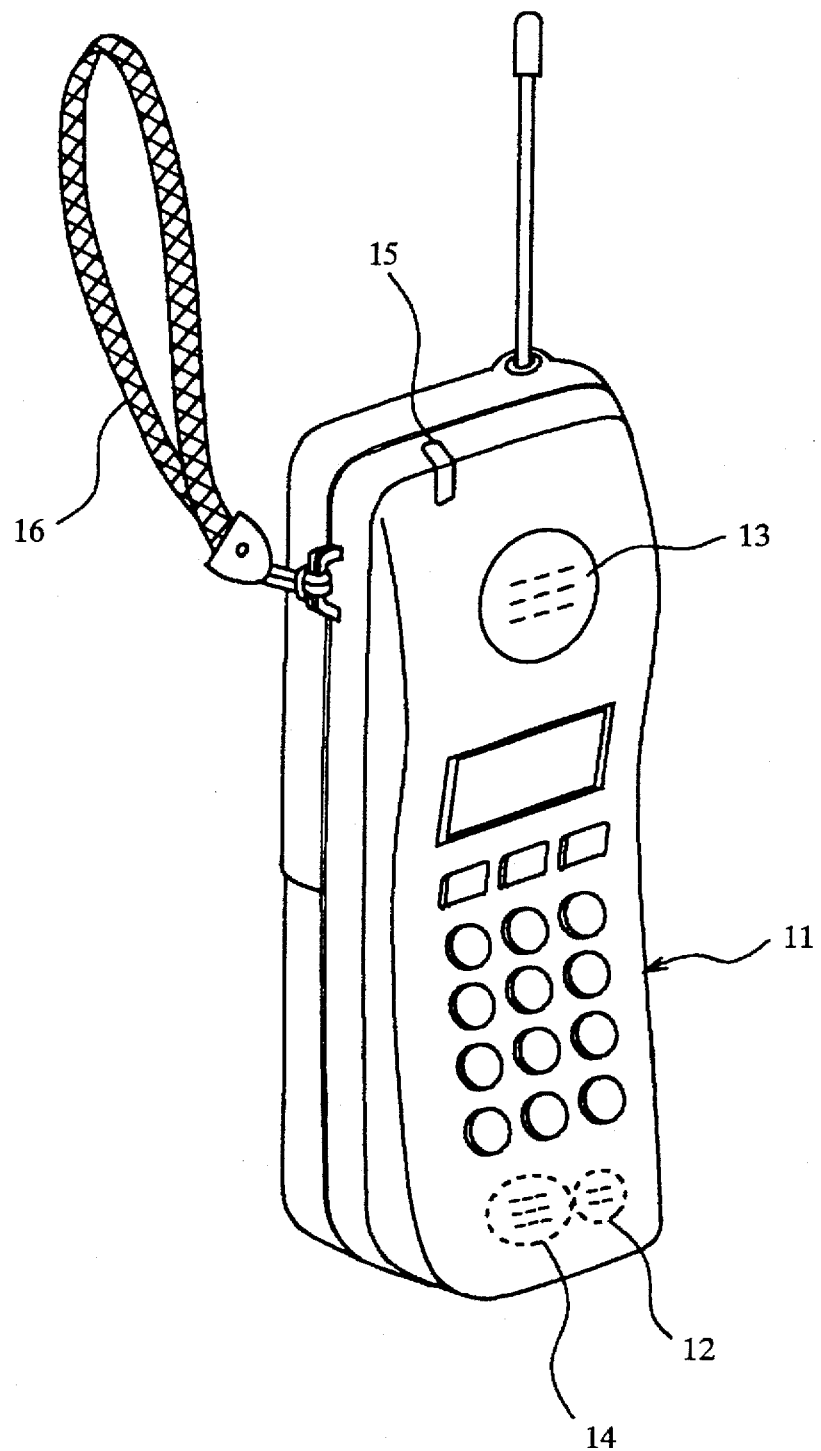
FIG. 1 is a perspective view showing the external appearance of a conventional portable radio telephone set.

As illustrated in FIG. 1, a portable radio telephone set according to an embodiment of the present invention is comprised of a main body 1, in which a speaker 2, a microphone 3, an indicator 4 such as a light emitting diode (LED) for informing of an incoming call by a blinking light, a sounder 5 for informing of an incoming call by sound, and other necessary members such as a key pad and a liquid crystal display are assembled thereinto as with the prior art shown in FIG. 1

A hand strap 6 in this embodiment has at its distal end an informer 7 which is mechanically and electrically connected to the main body 1 by means of a connector 8. The hand strap 6 is formed with material having sufficient strength and flexibility and at its internal portion has cables through which the main body 1 and the informer 7 are interconnected electrically. The cables may comprise optical fibers, as will be described later. In such a case, the connector 8 for electrical connection is unnecessary because the hand strap 6 requires no electrical connection. All that will be necessary for the hand strap 6 to be connected to the main body 1 is a mechanical connection.

The informer 7 informs the user of an incoming call, and sound, light, or vibration can be utilized as an informing means. The informer 7 in this embodiment, as with the indicator 4 and the sounder 5 provided in the main body 1, informs the user of an incoming call by sound and/or light.

Figure 2:
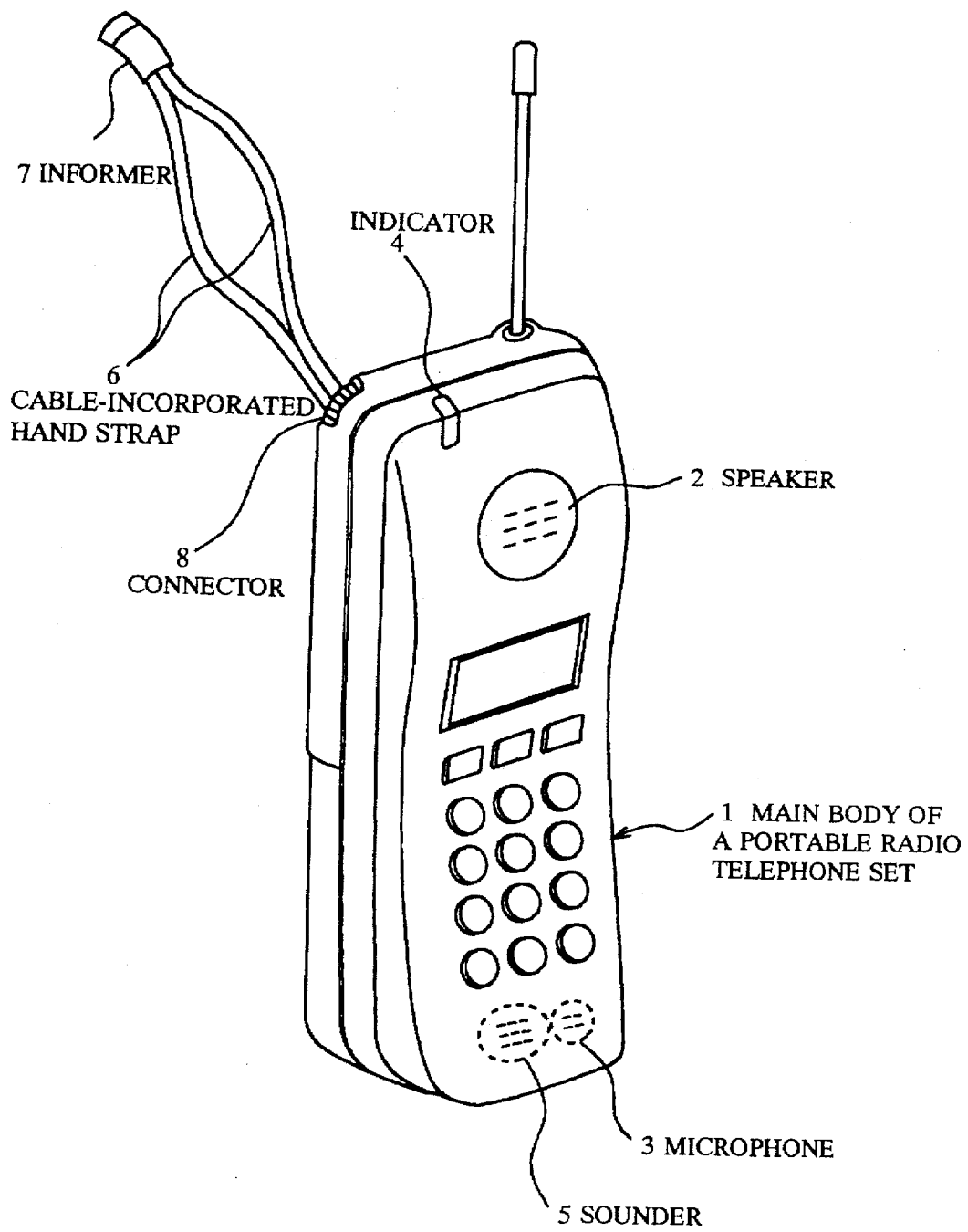
FIG. 2 is a perspective view showing the external appearance of an embodiment of a portable radio telephone set of the present invention.
Figure 3A:
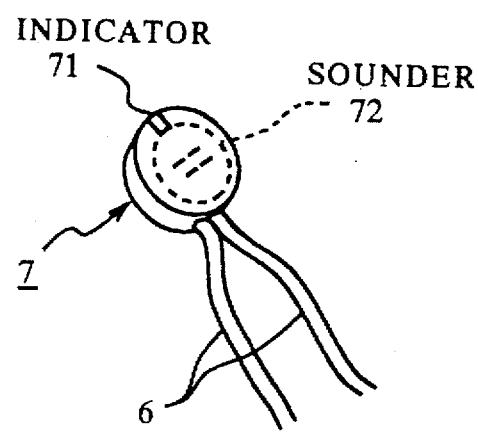
FIG. 3A is a perspective view showing a first example of the informer in the embodiment of FIG. 2.
Figure 3B:
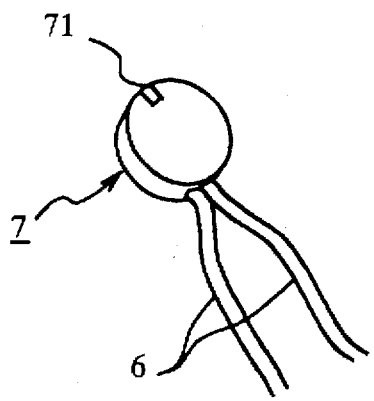
FIG. 3B is a perspective view showing a second example of the informer in the embodiment of FIG. 2.
Figure 3C:
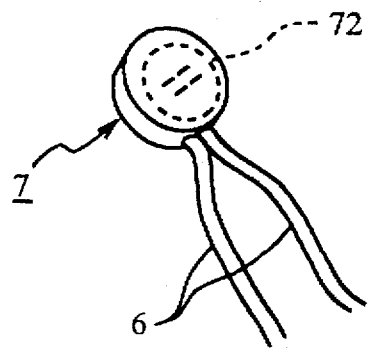
FIG. 3C is a perspective view showing a third example of the informer in the embodiment of FIG. 2.

FIGS. 3A to 3C illustrate concrete examples of the informer 7 in the embodiment of FIG. 2, respectively. In the first example of the informer 7, as shown in FIG. 3A, the informer 7 is provided with an LED indicator 71 and a sounder 72 which are similar to the indicator 4 and the sounder 5 incorporated in the main body 1, respectively. In this case, the main body 1 can be made structurally simpler because the indicator 4 and the sounder 5 of the main body 1 can be removed.

In the second example shown in FIG. 3B, only the indicator 71 is provided in the informer 7. The indicator 71, as with the indicator 4 on the main body side, informs of an incoming call by a blinking light. In the case of the second example, it is possible to constitute the cables of the hand strap 6 by optical fibers. More specifically, light which is emitted by the LED indicator 4 of the main body 1 is conducted to the informer 7 through the optical fibers of the hand strap 6, and the distal end of the optical fibers can be used as an indicator 71. The optical fibers, however, need to be formed with flexible material such as plastic material. Also, by forming the hand strap 6 itself with plastic optical fibers, it is possible to use the hand strap 6 as an indicator. If optical fibers are thus utilized, the LED used in the indicator 71 will become unnecessary and the telephone set will be advantageous in cost.

In the third example shown in FIG. 3C, only the ringer 72 is provided in the informer 7.

Figure 4:
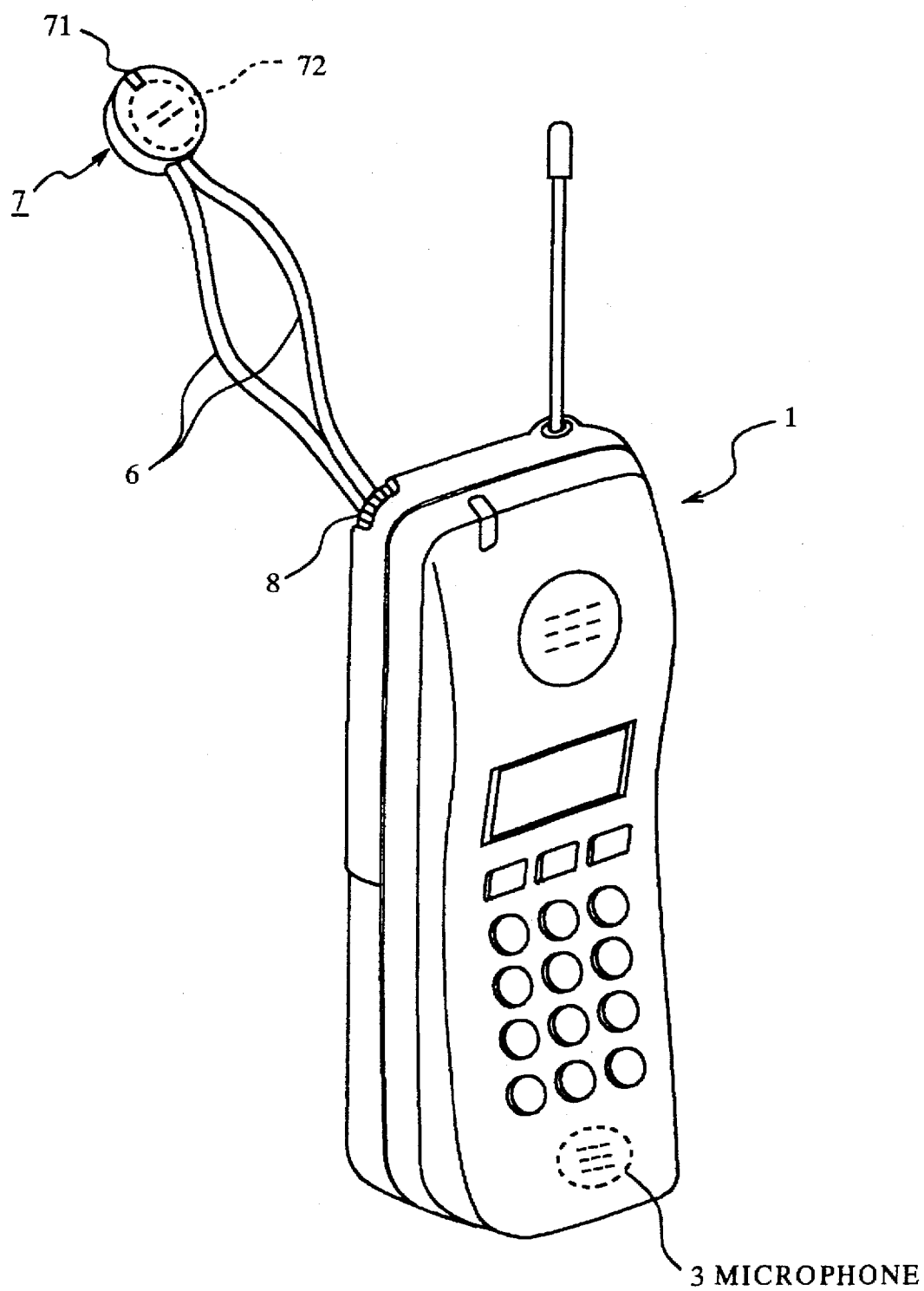
FIG. 4 is a perspective view showing the external appearance of another embodiment of the portable radio telephone set of the present invention.

As illustrated in FIG. 4, another embodiment of the present invention adopts the informer of FIG. 3A. Therefore, the indicator 71 and the sounder 72 have been provided in the informer 7, as described above. Therefore, the indicator 4 and the sounder 5 have been removed from the main body 1 of this embodiment. Of course the indicator 4 and the ringer 5 may be provided on the main body side. Also, the informers of FIGS. 3B and 3C may likewise be adopted.

Figure 5:
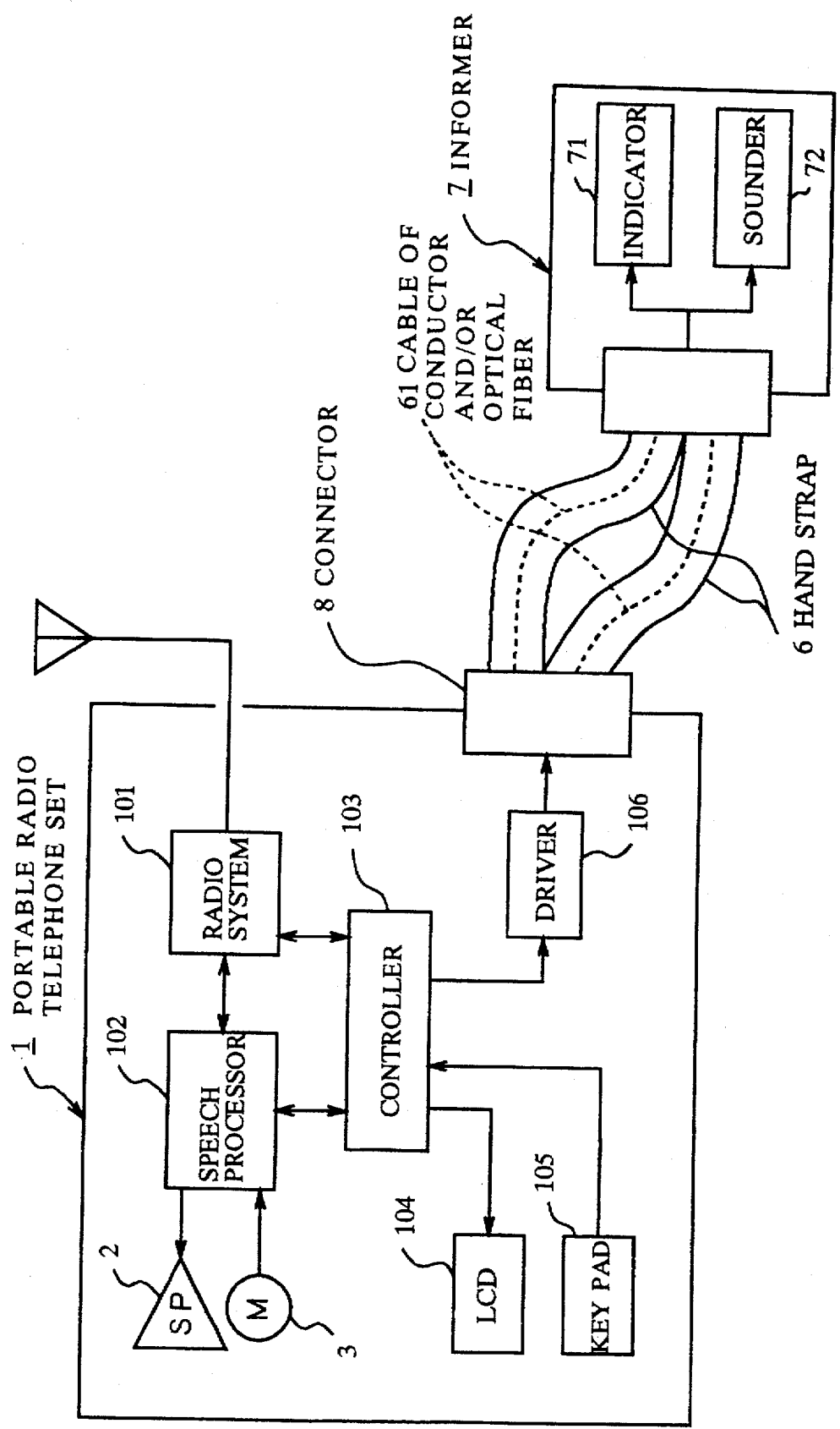
FIG. 5 is a schematic block diagram showing the circuit structure of the embodiment shown in FIG. 4.

FIG. 5 illustrates an internal circuit of the embodiment shown in FIG. 4. In a portable radio telephone set 1 there are provided a radio system 101 including a modem (modulator-demodulator), a speech processor 102 including a voice codec (coder-decoder), and a controller 103 for controlling the overall operations of the telephone set 1. Necessary data, such as address telephone numbers and messages, are displayed on a liquid crystal display (LCD) 104, and dialing or the like is performed by manually operating the key pad 105.

Further, the controller 103 controls a driver 106 such that the informer 7 is driven via the cables 61 of the hand strap 6. More specifically, when judging that a self-addressed signal has been received by the radio system 101, the controller 103 performs a call informing operation which causes the driver 106 to drive the indicator 71 and the sounder 72 of the informer 7 via the cables 61.

As has been described hereinbefore, the present invention is constructed so that the informer can be placed at a position away from the main body of the telephone set by providing the informer with the hand strap. Employing this arrangement, only the informer 7 can be put outside with the main body kept in a brief case or a pocket, and the user can be reliably informed of an incoming call.

While the subject invention has been described with relation to the preferred embodiments, various modifications and adaptations thereof will now be apparent to those skilled in the art. All such modifications and adaptations as fall within the scope of the appended claims are intended to be covered thereby.

What is claimed is:

1. A portable radio apparatus comprising:

a main body incorporating radio communication circuits, which includes a light generating circuit for generating light so as to inform a user of an incoming call;

a hand strap connected at one end to said main body, said hand strap including a conductor line and an optical fiber, said optical fiber being optically connected to said light generating circuit; and an informer for informing said user of said incoming call, said informer being mechanically connected to said main body through said hand strap, said informer being electrically connected with said main body through said conductor line of said hand strap, and said informer being optically connected with said main body through said optical fiber of said hand strap.

2. The portable radio apparatus as set forth in claim 1, wherein said informer comprises:

a sound generator for generating sound so as to inform said user of said incoming call, said sound generator being electrically connected with said conductor line of said hand strap; and an indicator for emitting light so as to inform said user of said incoming call, said indicator being optically connected to said optical fiber of said hand strap.

3. The portable radio apparatus as set forth in claim 2, wherein said indicator comprises an end of said optical fiber.

4. The portable radio apparatus as set forth in claim 2, wherein said main body has no sound generator.

5. The portable radio apparatus as set forth in claim 2, wherein said main body has no indicator.

6. The portable radio apparatus as set forth in claim 2, wherein said main body has neither a sound generator nor an indicator.

7. The portable radio apparatus as set forth in claim 1, wherein said main body has a sound generator for generating sound so as to inform said user of said incoming call and does not have an indicator for emitting light so as to inform said user of said incoming call.

* * * * *